United States Patent Office.

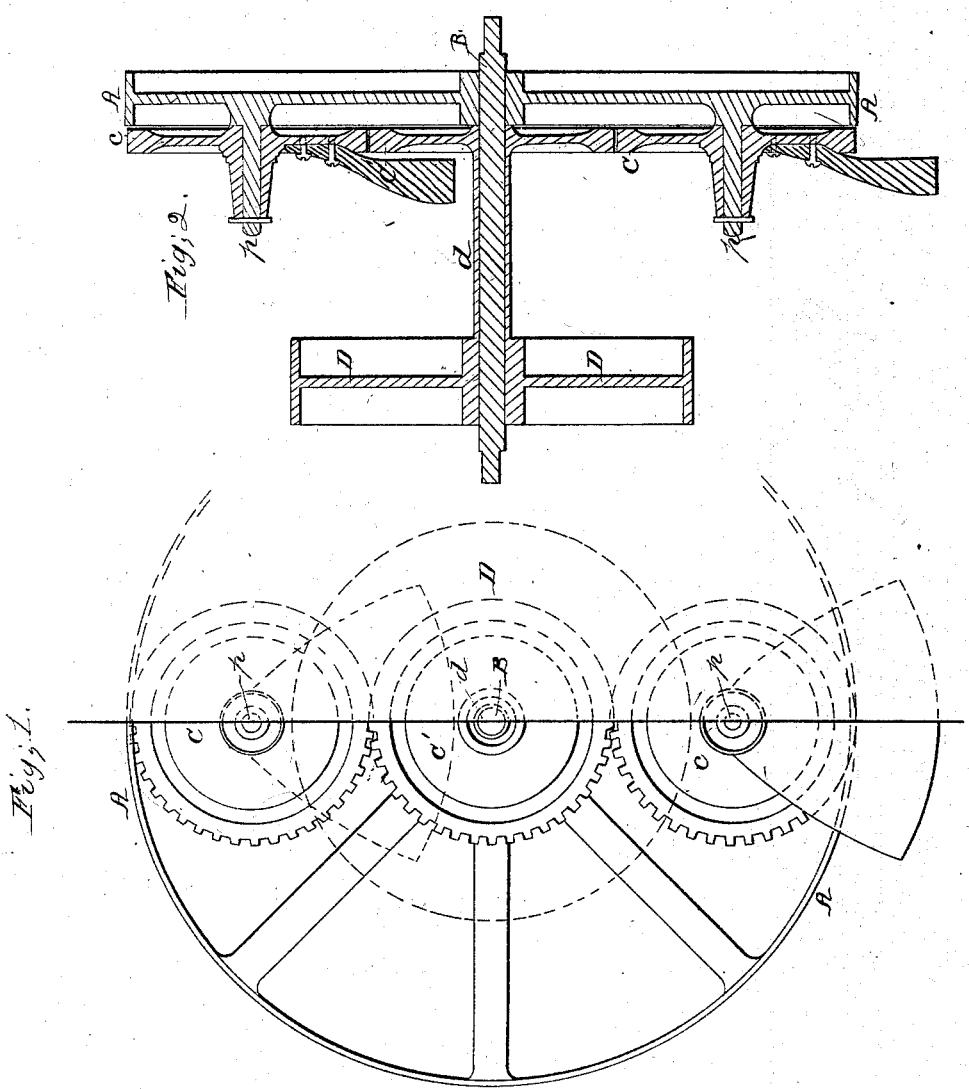

IMPROVEMENT IN COMMUNICATING MOTION.

WILLIAM BICKNELL, OF HARTFORD, MAINE.

Letters Patent No. 60,126, dated December 4, 1866.

SPECIFICATION.

TO ALL WHOM IT MAY CONCERN:

Be it known that I, WILLIAM BICKNELL, of Hartford, in the county of Oxford, and State of Maine, have invented a new and useful method of Communicating Motion from one wheel to another; and I do hereby declare that the following is a full, clear, and exact description of the construction and operation of the same, reference being had to the accompanying drawings, forming a part of this specification, sufficient to enable others skilled in the art to make and use my said invention without other invention or experiment.

My invention consists in a new method of communicating motion from one wheel to another.

Figure 1 is an elevation.

Figure 2 is a section of so much of the machine as shows its principle and mode of operation.

A is a fly-wheel mounted on a shaft, B. Upon pivots, $p$, on the side of said fly-wheel, are mounted one or more cog or friction-wheels, $c$, so arranged, by weights or otherwise, that a given plane passing through the axis of either of them shall always preserve the same angle with the horizon during the revolution of the fly-wheel. Upon a sleeve, $d$, turning freely on the shaft B, is mounted a drum, D, and a cog-wheel, $c'$, meshing into the cog-wheels $c$. Upon revolving fly-wheel A, if the cog-wheels $c$ and $c'$ are of the same number of teeth, drum D will move at twice the speed of wheel A. If wheels $c$ are of more teeth than $c'$, the speed will be increased; if they are less the speed will be diminished, because the cog-wheels $c$ make one revolution on their axis while wheel A, to which they are affixed, is making a revolution, and a combination of the direct revolutions of wheel A with the reverse revolution of wheels $c$, gives a revolution to wheel $c'$, and, by consequence, to drum D, to which motion is transmitted in the following proportion: velocity of A: velocity of D :: diameter of $c'$: twice diameter of $c$, but substituting the number of teeth in wheels $c$ and $c'$, when cog-wheels and not friction-wheels are used.

What I claim as my invention, and desire to secure by Letters Patent, is—

The new method of transmitting motion, consisting of the arrangement upon fly-wheel A, of cog or friction-wheels $c$, so constructed that a plane passing through the axis of either of them shall preserve the same angle with the horizon throughout the revolution of wheel A, said wheels $c$ driving wheel $c'$, substantially as described.

WILLIAM BICKNELL.

Witnesses:
 G. D. BISBEE,
 HENRY A. BICKNELL.